(12) United States Patent
Tsai et al.

(10) Patent No.: US 7,679,695 B2
(45) Date of Patent: Mar. 16, 2010

(54) BACKLIGHT MODULE HAVING LIGHT GUIDE PLATE WITH SLIDING STRIPS AND FRAME WITH SLIDING GUIDES AND LIQUID CRYSTAL DISPLAY WITH SAME

(75) Inventors: Cheng-Feng Tsai, Miao-Li (TW); Cheng-Hsien Yu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 197 days.

(21) Appl. No.: 11/982,859

(22) Filed: Nov. 5, 2007

(65) Prior Publication Data

US 2008/0106669 A1    May 8, 2008

(30) Foreign Application Priority Data

Nov. 3, 2006    (TW) .............................. 95140751 A

(51) Int. Cl.
*G02F 1/1333* (2006.01)

(52) U.S. Cl. .......................... 349/58; 349/65; 362/633; 362/634

(58) Field of Classification Search .................. 349/58, 349/65; 362/561, 615, 631, 632, 633
See application file for complete search history.

(56) References Cited

U.S. PATENT DOCUMENTS

| 6,961,103 B2 | 11/2005 | Sung et al. | |
| 2002/0093811 A1* | 7/2002 | Chen | 362/31 |
| 2006/0227572 A1* | 10/2006 | Chen | 362/633 |

* cited by examiner

*Primary Examiner*—Richard H Kim
(74) *Attorney, Agent, or Firm*—Wei Te Chung

(57) ABSTRACT

An exemplary backlight module (3) includes a light guide plate (32) and a frame (34) accommodating the light guide plate. The light guide plate includes a main body including two side surfaces (321), and two sliding strips (325). The sliding strips extend outward from the side surfaces of the main body. Each sliding strip includes a flexible detent (326). The frame includes two opposite first walls (341). The first walls defines two sliding guides (3411) slidably receiving the light guide plate whereby the light guide plate is slidable into the frame and detachably fixed in the frame by snapping engagement of the flexible detents with the frame.

19 Claims, 6 Drawing Sheets

BACKLIGHT MODULE HAVING LIGHT GUIDE PLATE WITH SLIDING STRIPS AND FRAME WITH SLIDING GUIDES AND LIQUID CRYSTAL DISPLAY WITH SAME

FIELD OF THE INVENTION

The present invention relates to backlight modules and liquid crystal displays (LCDs), and more particularly to a backlight module which includes a light guide plate with sliding strips and a frame with sliding guides.

GENERAL BACKGROUND

Liquid crystal displays are commonly used as displays for compact electronic apparatuses. This is because they not only provide good quality images with little power consumption, but they are also very thin. The liquid crystal in a liquid crystal display does not emit any light itself. The liquid crystal has to be lit by a light source so as to clearly and sharply display text and images. Thus, a backlight module is generally needed for a liquid crystal display.

Referring to FIG. 8, a typical liquid crystal display 8 includes a liquid crystal panel 80, and a backlight module 90 positioned for providing light beams to the liquid crystal panel 80.

The backlight module 90 includes an optical film assembly 91, a light guide plate (LGP) 92, a plurality of light emitting diodes (LEDs) 93, and a plastic frame 94. The light guide plate 92, the optical film assembly 91, and the liquid crystal panel 80 are arranged in that order from bottom to top. The plastic frame 94 is used to accommodate the liquid crystal panel 80, the optical film assembly 91, the light guide plate 92, and the LEDs 93.

The light guide plate 92 is generally rectangular, and includes a light incident surface 921, a top light emitting surface 922 perpendicularly adjoining the light incident surface 921, a bottom surface 923, and two opposite side surfaces 924. The side surfaces 924 perpendicularly connect with the light incident surface 921, the light emitting surface 922, and the bottom surface 923. Each side surface 924 includes a pair of first ears 927 and a second ear 928 extending perpendicularly outward therefrom. The first ears 927 are located at opposite ends of the side surface 924, respectively. The second ear 928 is located in a middle of the side surface 924.

Each of the first ears 927 is half as thick as a main body of the light guide plate 92, and has a top surface coplanar with the light emitting surface 922. The second ear 928 is half as thick as the main body of the light guide plate 92, and has a base surface coplanar with the bottom surface 923. The light guide plate 92 can be made from polycarbonate (PC) or polymethyl methacrylate (PMMA), and can be manufactured by an injection molding method.

The plastic frame 94 includes two opposite first side walls 941 and two opposite second side walls 942. The first side walls 941 and the second side walls 942 are alternately arranged end to end. The first side walls 941 are longer than the second side walls 942. Each first side wall 941 defines a pair of first notches 947 and a second notch 948. The first notches 947 are located at opposite ends of the first side wall 941 respectively, and correspond to respective first ears 927 of the light guide plate 92. The second notch 942 is located in a middle of the first side wall 942, and corresponds to a respective second ear 928 of the light guide plate 92. One of the second side walls 942 defines a plurality of recesses 9420 to receive the LEDs 93.

Referring also to FIG. 9, the first ears 927 are inserted into the first notches 947, respectively. The second ears 928 are inserted into the second notches 948, respectively. Thus, the light guide plate 92 is received in and supported by the plastic frame 94.

In the process of assembly of the backlight module 90, the first ears 927 and the second ears 928 are generally pressed into the first notches 947 and the second notches 948 by applying manual force. This may result in the plastic frame 94 being distorted or even being damaged. When this occurs, the mechanical stability and the performance of the backlight module 90 are liable to be impaired.

What is needed, therefore, is a backlight module that can overcome the above-described deficiencies. What is also needed is a liquid crystal display including the backlight module.

SUMMARY

In one preferred embodiment, a backlight module includes a light guide plate and a frame accommodating the light guide plate. The light guide plate includes a main body including two side surfaces, and two sliding strips. The sliding strips extend outward from the side surfaces of the main body. Each sliding strip includes a flexible detent. The frame includes two opposite first walls. The first walls defines two sliding guides slidably receiveing the sliding strips whereby the light guide plate is slidable into the frame and detachably fixed in the frame by snapping engagement of the flexible detents with the frame.

Other novel features and advantages will become more apparent from the following detailed description of preferred and exemplary embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
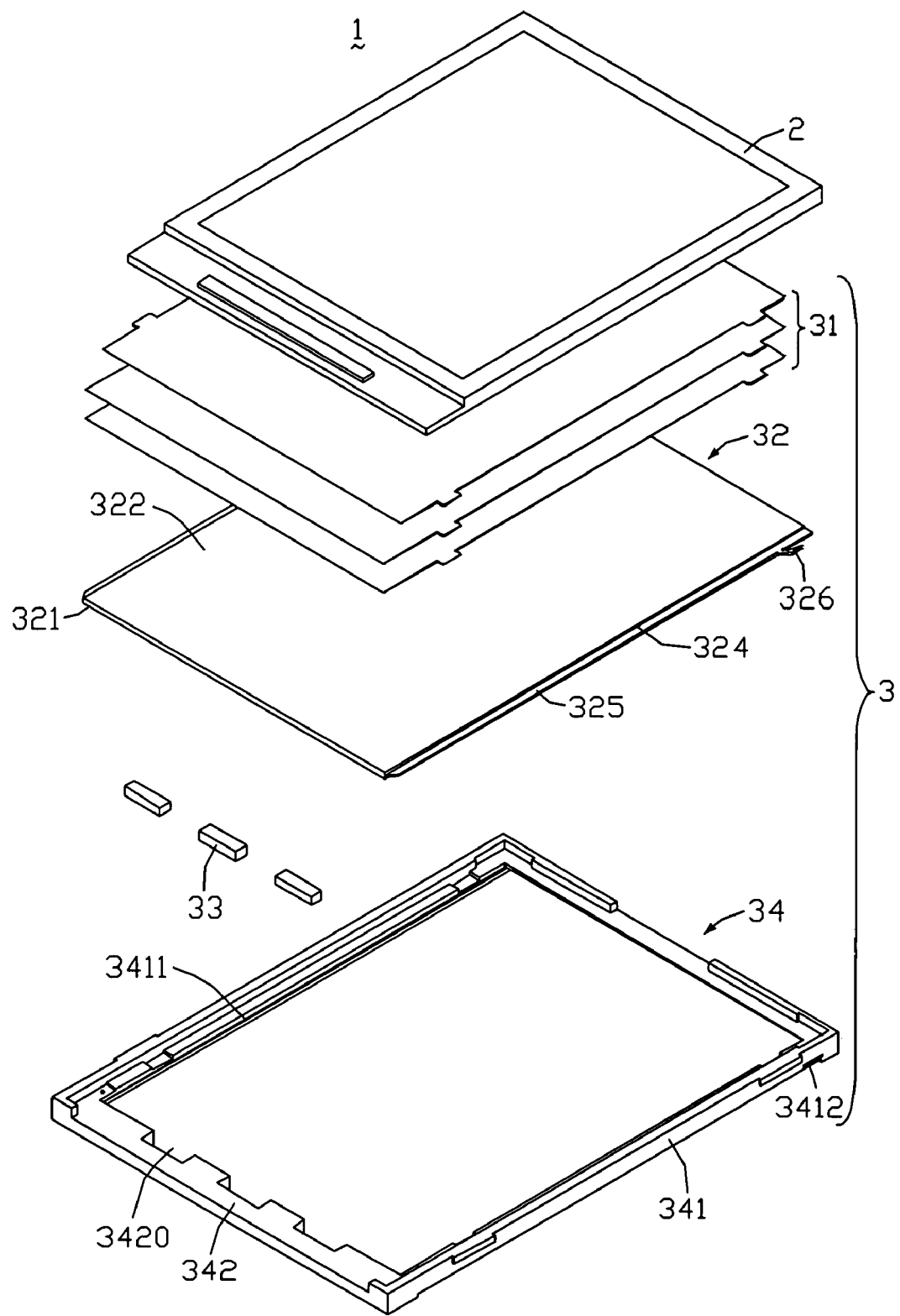
FIG. 1 is an exploded, isometric view of a liquid crystal display according to a first embodiment of the present invention, the liquid crystal display including a light guide plate (LGP) and a plastic frame.

Referring to FIG. 1, a liquid crystal display 1 according to a first embodiment of the present invention is shown. The liquid crystal display 1 includes a liquid crystal panel 2, and a backlight module 3 located adjacent to the liquid crystal panel 2. The backlight light module 3 includes an optical film assembly 31, a light guide plate (LGP) 32, a light source 33, and a plastic frame 34. The light source 33 includes a plurality of light emitting diodes (LEDs).

The light guide plate 32, the optical film assembly 31 and the liquid crystal panel 2 are arranged in that order from bottom to top. The plastic frame 34 is used to accommodate the light guide plate 32, the optical film assembly 31, the liquid crystal panel 2, and the light source 33.

The light guide plate 32 includes a light incident surface 321, a light emitting surface 322, and two opposite side surfaces 324. The light emitting surface 322 perpendicularly connects with the light incident surface 321. The side surfaces 324 both perpendicularly connect with both the light incident surface 321 and the light emitting surface 322.

Figure 2:
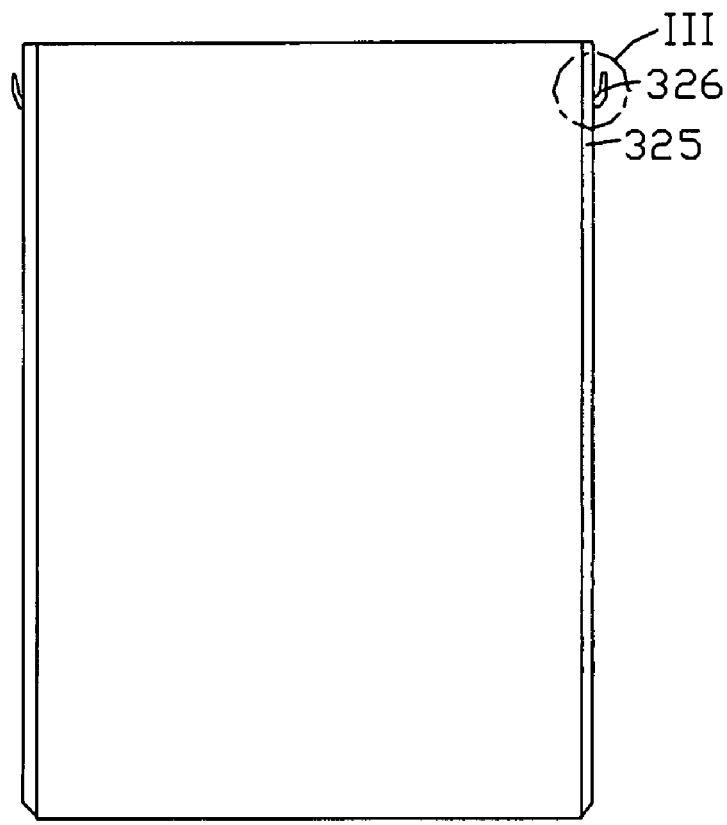
FIG. 2 is a top plan view of the light guide plate of FIG. 1, the light guide plate including a plurality of flexible detents.

Referring to FIG. 2, each side surface 324 includes a sliding strip 325 extending outward therefrom. A thickness of the sliding strip 325 is less than a thickness of a main body of the light guide plate 32. Each sliding strip 325 includes a flexible detent 326 extending outward from a main body thereof. A thickness of the flexible detent 326 is the same as a thickness of the sliding strip 325. The flexible detent 326 is located at an end of the sliding strip 325 far from the light incident surface 321.

Figure 3:
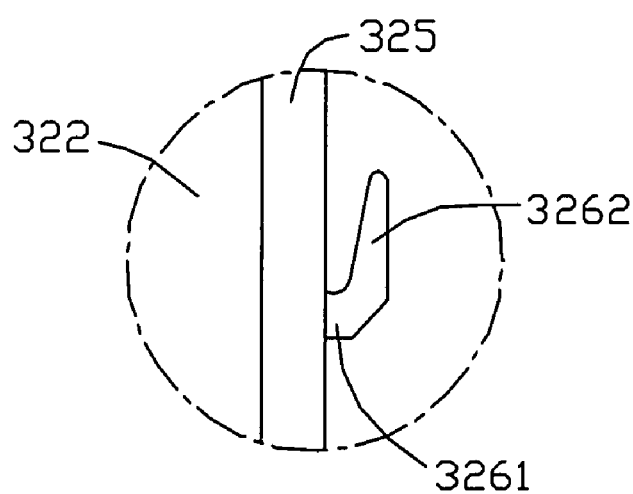
FIG. 3 is an enlarged view of a circle portion III of FIG. 2.

Referring also to FIG. 3, the flexible detent 326 includes a base portion 3261 and a flexible arm 3262. The base portion 3261 and the flexible arm 3262 are integrally formed as a one-piece body together with the main body of the flexible detent 326. The base portion 3261 has an essentially rectangular shape. The flexible arm 3262 extends from the base portion 3261 in a direction away from the light incident surface 321. A corner where the base portion 3261 meets the flexible arm 3262 is an oblique cutout. Each flexible arm 3262 and an opposite portion of the main body of the light guide plate 32 define a space therebetween. The flexible arm 3262 elastically deforms into the space when it is pressed. A tip portion of the flexible arm 3262 is generally semicylindrical and smooth.

The light guide plate 32 can be made from polycarbonate (PC) or polymethyl methacrylate (PMMA), and can be manufactured by an injection molding method.

The plastic frame 34 has a substantially rectangular shape, including two first side walls 341 opposite to each other and two second side walls 342 opposite to each other. The first side walls 341 are essentially perpendicular to the second side walls 342. The first side walls 341 and the second side walls 342 are alternately arranged end to end to cooperatively define an accommodating space therebetween. The accommodating space is for receiving the light guide plate 32, the optical film assembly 31, the liquid crystal panel 2, and the light source 33.

Each first side wall 341 defines a sliding guide 3411 corresponding to a respective sliding strip 325 of the light guide plate 32. A height of the sliding guide 3411 is substantially equal to or slightly greater than the thickness of the sliding strip 325 of the light guide plate 32. A length of the sliding guide 3411 is substantially equal to a length of the sliding strip 325. That is, the sliding guides 3411 can receive and support the sliding strips 325 tightly.

Each first side wall 341 further defines a first opening 3412 therein. The first opening 3412 communicates with the sliding guide 3411, and corresponds to a respective flexible detent 326 of the light guide plate 32. A height of the first opening 3412 is substantially equal to or slightly greater than the thickness of the flexible detent 326. A length of the first opening 3412 is substantially equal to a length of the flexible detent 326. That is, the flexible detents 326 can be elastically received in the first openings 3412, whereupon the flexible detents 326 abut inner surfaces of the first side walls 341 that bound the first openings 3412.

One of the second side walls 342 that is adjacent to the light incident surface 321 of the light guide plate 32 defines a plurality of recesses 3420 to receive the LEDs of the light source 33. The other second side wall 342 that is far from the light incident surface 321 of light guide plate 32 defines a second opening (not labeled). The second opening communicates with ends of the sliding guides 3411. A height of the second opening is substantially equal to or slightly greater than the thickness of the main body of the light guide plate 32. A width of the second opening is substantially equal to or slightly greater than a horizontal width of the main body of the light guide plate 32.

The plastic frame 34 is preferably made from polycarbonate, another kind of plastic, or another suitable material.

Figure 4:
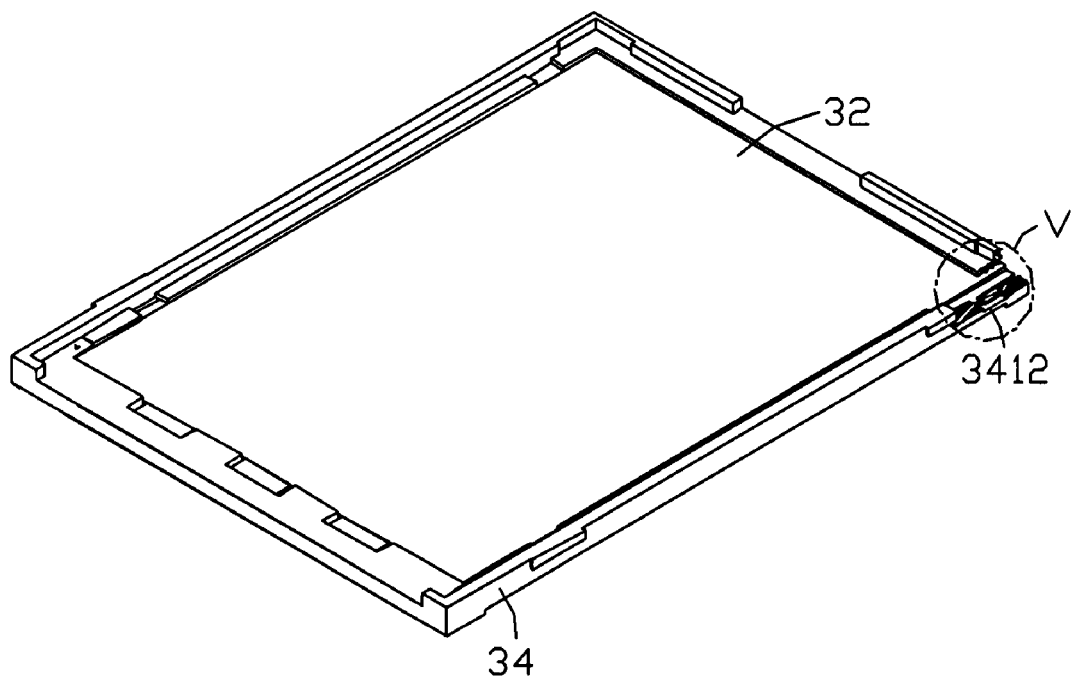
FIG. 4 is an assembled view of the plastic frame and the light guide plate of the liquid crystal display of FIG. 1, showing part of the plastic frame cut away.
Figure 5:
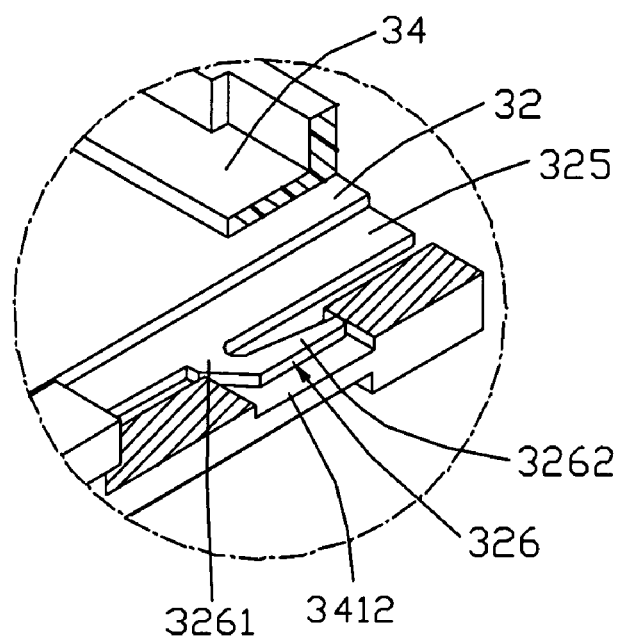
FIG. 5 is an enlarged view of a circle portion V of FIG. 4.

Referring also to FIG. 4 and FIG. 5, the light guide plate 32 and the plastic frame 34 are attached together as follows. Firstly, the light guide plate 32 is aligned with the second opening of the plastic frame 34, with the light incident surface 321 facing the second opening. Then, the light guide plate 32 is pushed into the plastic frame 34 through the second opening and into the sliding guides 3411. Thus, the sliding strips 325 respectively enter and slide along the two sliding guides 3411. The flexible detents 326 are elastically deformed when they enter the sliding guides 3411, and thereupon the flexible detents 326 slide short distances along the sliding guides 3411. When the light incident surface 321 contacts an inner edge of the second side wall 342 that has the recesses 3420, the flexible detents 326 reach the first openings 3412. Thereupon the flexible detents 326 rebound and are snappingly received in the first openings 3412. The flexible detents 326 respectively abut inner surfaces of the first side walls 341 that bound the first openings 3412, and thereby prevent the light guide plate 32 from sliding out from the plastic frame 34. That is, the light guide plate 32 is completely accommodated and secured in the plastic frame 34.

In order to remove the light guide plate 32 from the plastic frame 34, the flexible detents 326 are pressed inward. This can be done by accessing the flexible detents 326 through the first openings 3412 using a suitable tool or tools. Thus, the flexible detents 326 are pressed toward the corresponding side surfaces 324 of the light guide plate 32, and the tip portions of the flexible arms 3262 can be pushed into the sliding guides 3411. Further or alternatively, the light guide plate 32 can be pulled slightly out from the plastic frame 34 so that the tip portions of the flexible arms 3262 are pulled into the sliding guides 3411. Thereafter, the light guide plate 32 is pulled so that the sliding guides 3411 of the plastic frame 34 slide along the sliding guides 3411 until the light guide plate 32 is completely removed from the plastic frame 34.

Unlike conventional liquid crystal displays, the light guide plate 32 of the liquid crystal display 1 is received in the plastic frame 34 by sliding motion instead of by forcible pressing. The light guide plate 32 is thus detachably fixed in the plastic frame 34 by the cooperation of the flexible detents 326 and the first openings 3412. The light guide plate 32 can be pulled out from the plastic frame 34 by first pressing the flexible detents 326 out from the first openings 3412. Therefore distortion of the plastic frame 34 can be avoided. The backlight module 3 can be safely assembled or disassembled, and the mechanical stability and the performance of the backlight module 3 as well as the liquid crystal display 1 are thereby maintained.

Figure 6:
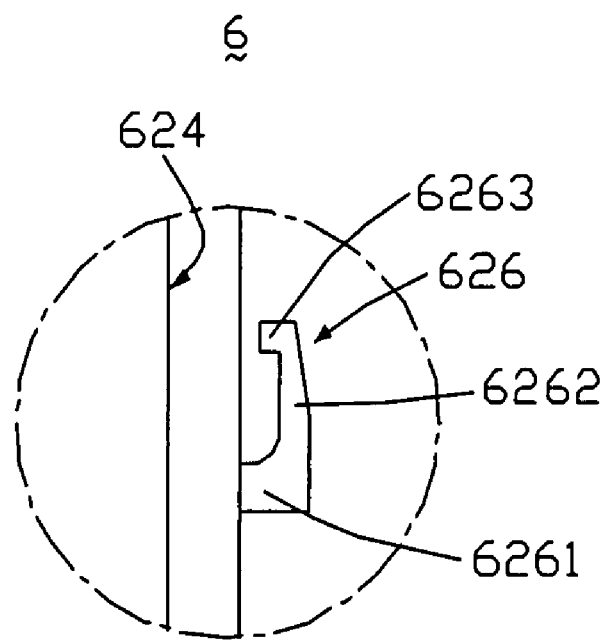
FIG. 6 is similar to FIG. 3, but showing a corresponding view in the case of a flexible detent of a liquid crystal display according to a second embodiment of present invention.

Referring to FIG. 6, a liquid crystal display 6 according to a second embodiment of the present invention is similar in principle to the liquid crystal display 1. However, each of flexible detents 626 of the liquid crystal display 6 includes a base portion 6261 and a flexible arm 6262. The base portion 6261 has an essentially rectangular shape. The flexible arm 6262 includes a protrusion 6263. The protrusion 6263 extends from a distal end of the flexible arm 6262 toward a side surface 624.

Figure 7:
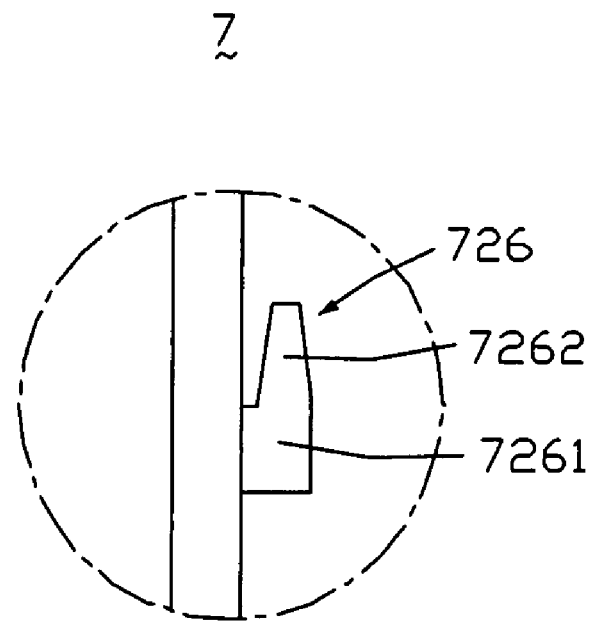
FIG. 7 is similar to FIG. 6, but showing a corresponding view in the case of a flexible detent of a liquid crystal display according to a third embodiment of present invention.
Figure 8:
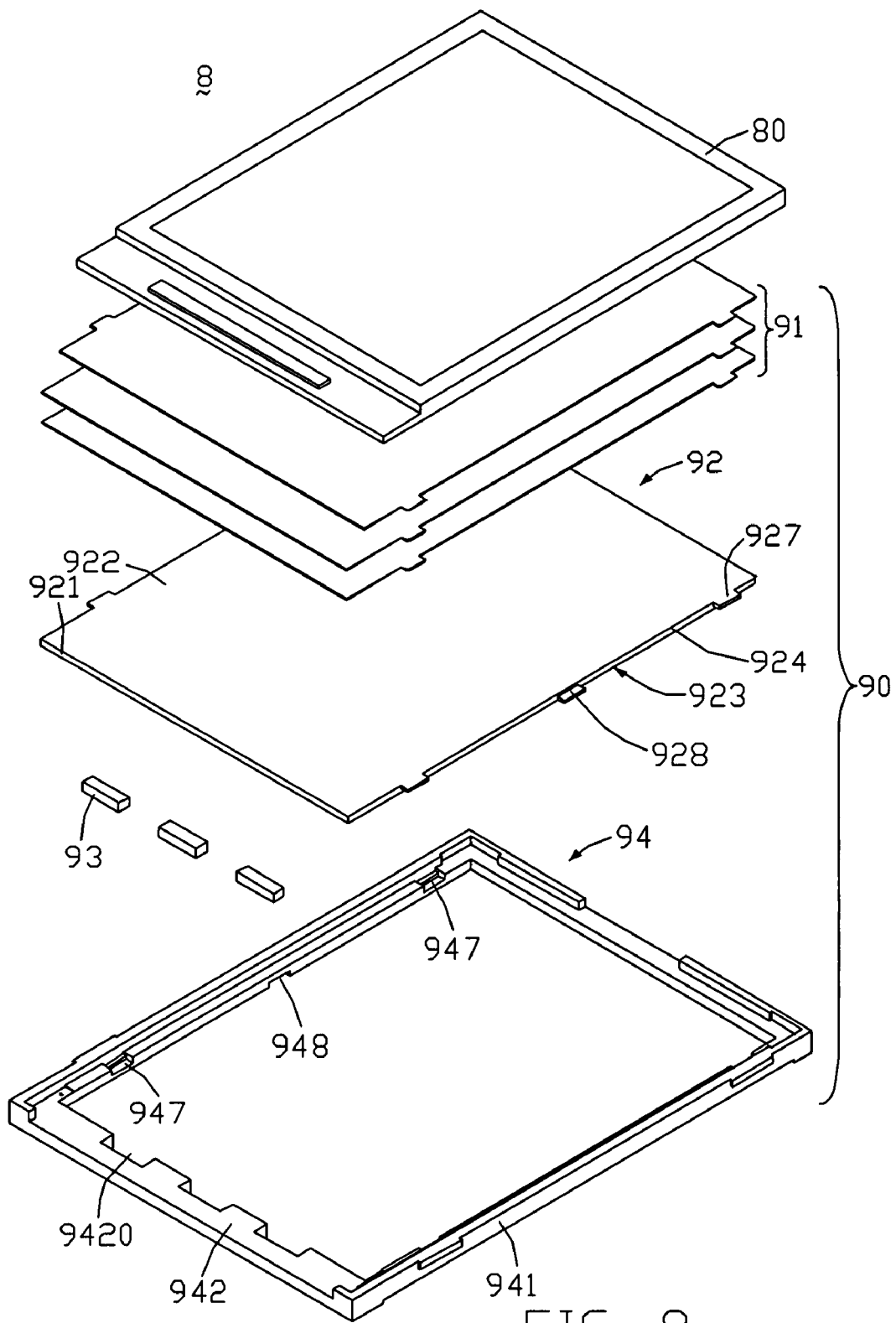
FIG. 8 is an exploded, isometric view of a conventional liquid crystal display, the liquid crystal display including a backlight module.
Figure 9:
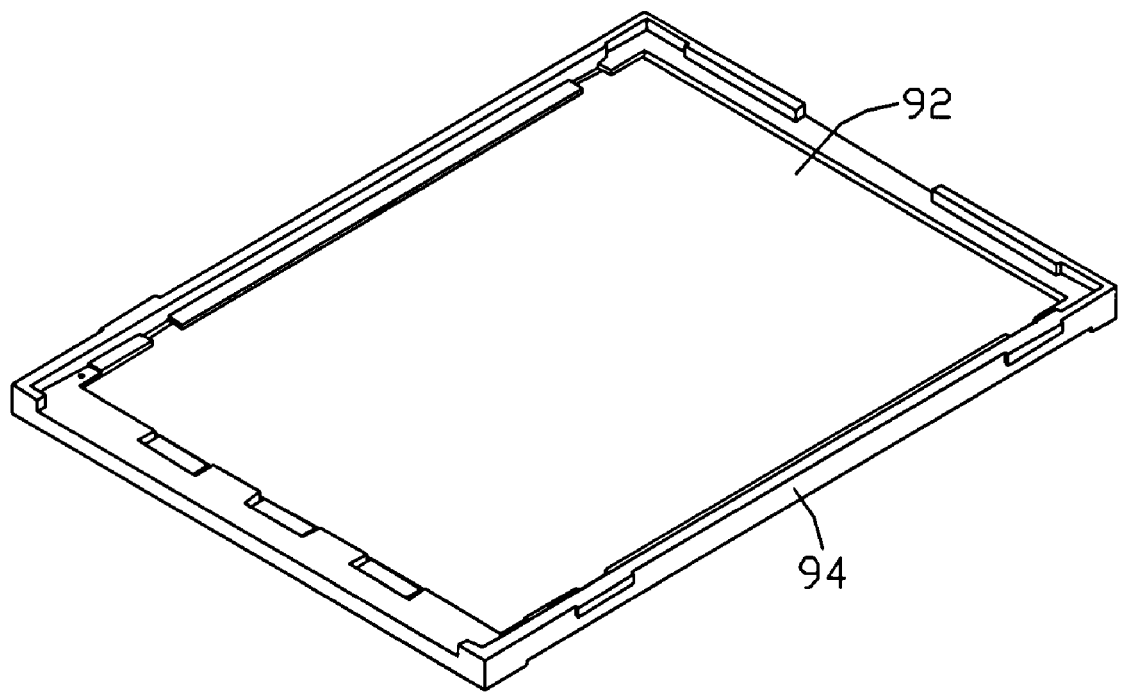
FIG. 9 is an assembled view of backlight module of FIG. 8.

Referring to FIG. 7, a liquid crystal display 7 according to a third embodiment of the present invention is similar in principle to the liquid crystal display 2. However, each of flexible detents 726 of the liquid crystal display 7 includes a base portion 7261 and a flexible arm 7262. The flexible arm 7262 has a generally isosceles trapezoid shape.

Further or alternative embodiments may include the following. In one example, a backlight module can include more than two flexible detents. In a further example, each flexible arm of a light guide plate can have another kind of suitable shape besides the shapes described above, with such other kind of shape having smooth surfaces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
a light guide plate comprising a main body comprising two side surfaces, and two sliding strips extending outward from the side surfaces, each sliding strip comprising a flexible detent; and
a frame accommodating the light guide plate, the frame comprising two opposite first walls, the first walls defining two sliding guides slidably receiving the sliding strips whereby the light guide plate is slidable into the frame and detachably fixed in the frame by snapping engagement of the flexible detents with the frame.

2. The backlight module as claimed in claim 1, wherein each flexible detent comprises a flexible portion which is elastically deflected toward the main body of the light guide plate in the process of sliding the sliding strips along the sliding guides.

3. The backlight module as claimed in claim 2, wherein the flexible portion comprises a tip portion, and the tip portion is generally semicylindrical.

4. The backlight module as claimed in claim 2, wherein the flexible portion has a generally trapezoidal shape.

5. The backlight module as claimed in claim 2, wherein the flexible portion comprises a protrusion, the protrusion extending from a distal end of the flexible portion toward the main body of the light guide plate.

6. The backlight module as claimed in claim 2, wherein a space is formed between each flexible portion and the main body of the light guide plate, and the flexible portion is pressed into the space in the process of sliding the sliding strips along the sliding guides.

7. The backlight module as claimed in claim 1, wherein the frame further defines two first openings communicating with the sliding guides respectively, and the flexible detents are snappingly engaged in the first openings.

8. The backlight module as claimed in claim 7, wherein the first openings are through holes.

9. The backlight module as claimed in claim 2, wherein each flexible detent further comprises a base portion, which extends from the main body and from which the flexible portion extends, and the light guide plate is a single piece of material comprising the main body, the base portions and the flexible portions.

10. The backlight module as claimed in claim 9, wherein the base portion has an essentially rectangular shape.

11. The backlight module as claimed in claim 9, wherein a corner of the flexible detent where the base portion adjoins the flexible portion is obliquely cut.

12. The backlight module as claimed in claim 1, wherein the frame further comprises a second side wall between the first side walls, and the second side wall defines a second opening communicating with ends of the sliding guides.

13. The backlight module as claimed in claim 12, wherein a shape and size of the second opening is substantially the same as a transverse cross-sectional shape of the main body of the light guide plate.

14. A backlight module comprising:
a light guide plate comprising two side surfaces and two ledges extending outward from the side surfaces, each ledge comprising a flexible detent; and
a frame accommodating the light guide plate, the frame comprising two opposite first walls, the first walls defining two guideways and two first openings, the guideways slidably receiving the ledges, and the first openings receiving the flexible detents such that the light guide plate is detachably held in the frame.

15. The backlight module as claimed in claim 14, wherein the flexible detents are snappingly engaged in the first openings.

16. The backlight module as claimed in claim 14, wherein the flexible detents abut against inner surfaces of the first walls that bound the first openings.

17. The backlight module as claimed in claim 14, wherein when the ledges are slid along the guideways, the flexible detents are deflected toward the side surfaces of the light guide plate.

18. The backlight module as claimed in claim 17, wherein the light guide plate comprising the ledges and the flexible detents is a one-piece body.

19. A liquid crystal display comprising:
a liquid crystal panel: and
a backlight module positioned for providing light to the liquid crystal panel, the backlight module comprising:
a light guide plate comprising a main body comprising two side surfaces, and two sliding strips extending outward from the side surfaces, each sliding strip comprising a flexible element; and
a frame accommodating the light guide plate, the frame comprising two opposite first walls, the first walls defining two sliding guides slidably receiving the sliding strips whereby the light guide plate is slidable into the frame and detachably fixed in the frame by snapping engagement of the flexible elements with the frame.

* * * * *